United States Patent [19]

Poulsen

[11] Patent Number: 5,056,206
[45] Date of Patent: Oct. 15, 1991

[54] METHOD FOR SECURING A TIRE CHAIN TO A TIRE

[76] Inventor: Thomas E. Poulsen, Box 19, Jiggs, Nev. 89801

[21] Appl. No.: 154,119

[22] Filed: Feb. 8, 1988

[51] Int. Cl.$^5$ .................. B21D 39/00; B23P 11/00; B60C 27/06
[52] U.S. Cl. .................. 29/428; 29/433; 29/525.1; 29/453; 152/231; 152/239; 152/241
[58] Field of Search .............. 152/213 R, 213 A, 231, 152/239, 217, 241; 29/446, 433, 428, 525.1, 453

[56] References Cited

U.S. PATENT DOCUMENTS

2,462,378 2/1949 Fox ..................... 152/213 A
2,537,392 1/1951 Bettcher ................. 152/213 R

Primary Examiner—Caleb Weston
Assistant Examiner—Gregory J. Wilber

[57] ABSTRACT

In the several embodiments, the tire chain, and a method of installing a tire chain in which a line extends from each of the opposite ends of the portion of the tire chain that encircles the inside of a tire. In a preferred embodiment, the two lines cross the treaded portion of the tire diagonally, so that one line crosses the other, and are connected to the portion of the tire chains that encircle the outside of the tire. Preferably, the two lines are connected to each other at the point where they cross, which is about at the center of the treaded surface of the tire.

22 Claims, 13 Drawing Sheets

METHOD FOR SECURING A TIRE CHAIN TO A TIRE

BACKGROUND OF THE INVENTION

The process of installing tire chains has heretofore been a messy and often uncomfortable job. The installer must attach the ends of the inside portion of the tire chains together by reaching behind the tire with his hands. Since this attachment must usually be done in view of the installer, he or she typically must assume a partially prone position, or rest on one knee, in order to make the connection. Of course, all this is usually done in the snow.

It is, therefore, an object of the present invention to provide a method of securely attaching a tire chain onto a tire that is easier than conventional methods. It is also an object to provide such a tire chain that may be easily and securely attached onto a tire.

SUMMARY OF THE INVENTION

In the several embodiments, the invention consists of a tire chain in which a line extends from each of the opposite ends of the portion of the tire chain that encircles the inside of a tire. In a preferred embodiment, the two lines cross the treaded portion of the tire diagonally, so that one line crosses the other, and are connected to the portion of the tire chains that encircle the outside of the tire. Preferably, the two lines are connected to each other at the point where they cross, which is about at the center of the treaded surface of the tire.

By its method of installation, the installer of the tire chain can complete the job without doing anything more messy or undesirable then putting his or her hands on the treaded surface of the tire, or just behind the treaded surface, while remaining on his feet in a squatting position.

DETAILED DESCRIPTION

Figures 1, 2:
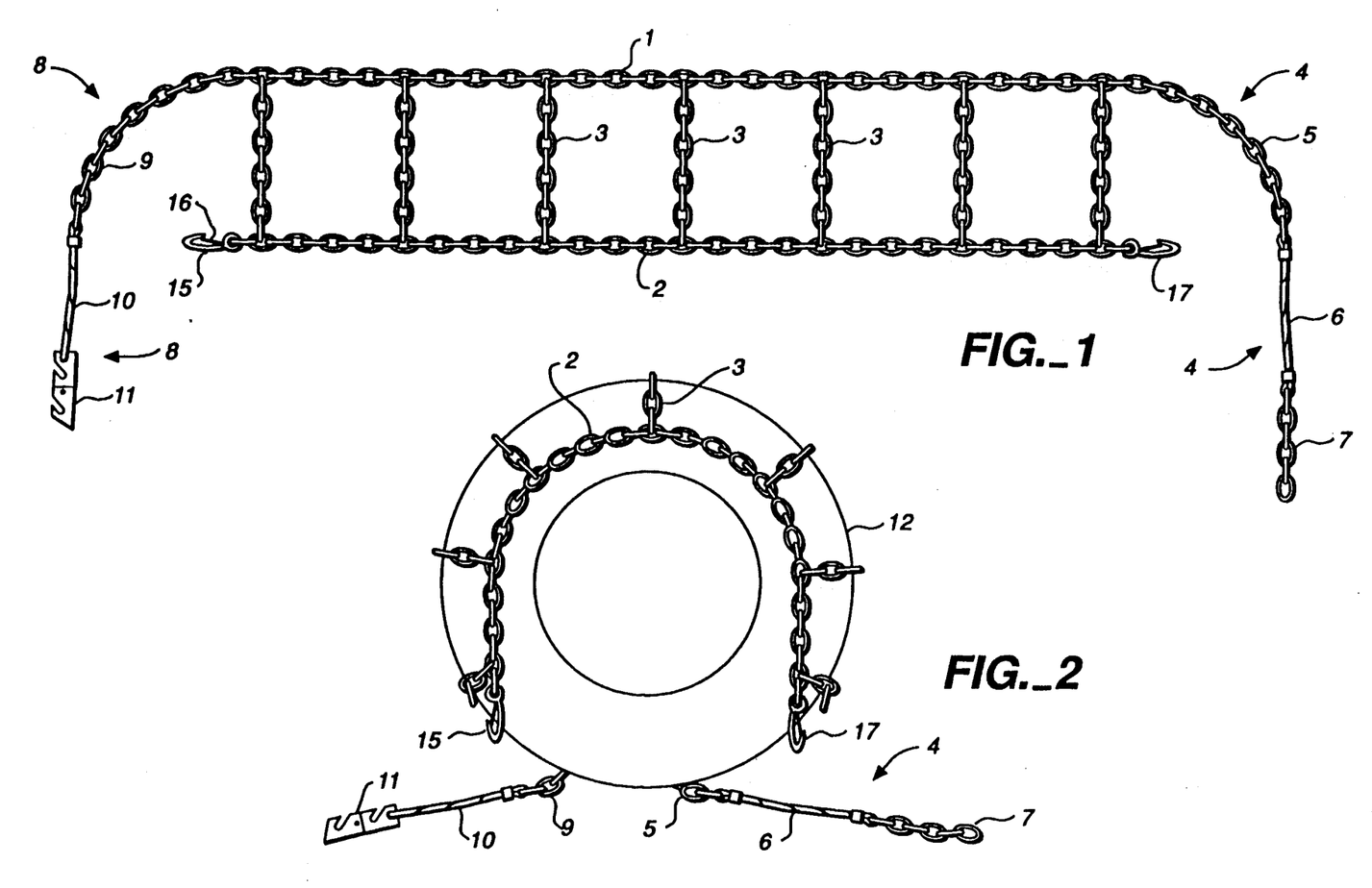
FIG. 1 is a view of the first embodiment of the invention as it would appear lying flat on the ground.
FIG. 2 is a view of the first embodiment of the invention as it would appear at a stage of installation onto a tire.

In one embodiment of the present invention best seen in FIG. 1, a standard type of tire chain is shown with the improved securement means attached thereto. The conventional portion of the tire chain includes two relatively long lengths of chain running basically parallel. The inside length of chain 1 and the outside length of chain 2 have running laterally between them a plurality of shorter lengths of chain 3, each one being connected at one end to the inside length of chain 1 and at the other end to the outside length of chain 2 at more or less equal intervals. The construction as described so far is identical to that of conventional tire chains without the connection means.

Extending from one end of the inside length of chain 1 is a line shown generally as 4 comprised of a chain 5, with a length of cable 6 extending from the end of the chain 5, and another length of chain 7 extending from the end of the length of cable 6.

Extending from the other end of the inside length of chain 1 is another line shown generally as 8, comprised of a length of chain 9, a cable 10, and a binder type chain latch 11 attached at the end of the cable 10.

Figure 4:
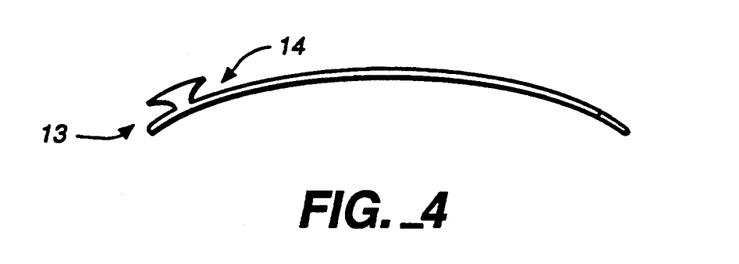
FIG. 4 is a view of a device used to assist in installing various embodiments of the invention onto a tire.

When installing this embodiment of the present invention onto a tire, the tire chain is preferably draped over the top of the tire 12 as depicted in FIG. 2, with the inside length of chain 1 on the inside of the tire 12, and the outside length of chain 2 on the outside of the tire 12. The ends of the two lines 4 and 8 are each brought to the front of the tire 12 after being passed around behind the tire 12 so that the two lines 4 and 8 cross each other behind the tire 12 as best seen in FIG. 2. In order to assist in this procedure, a curved rod, such as the one shown in FIG. 4 may be used by pushing the lines with the front hook or wedge 13, or pulling the lines with the back hook or wedge 14. Of course, a makeshift device such as a bent coat hanger may also be used.

Figure 3:
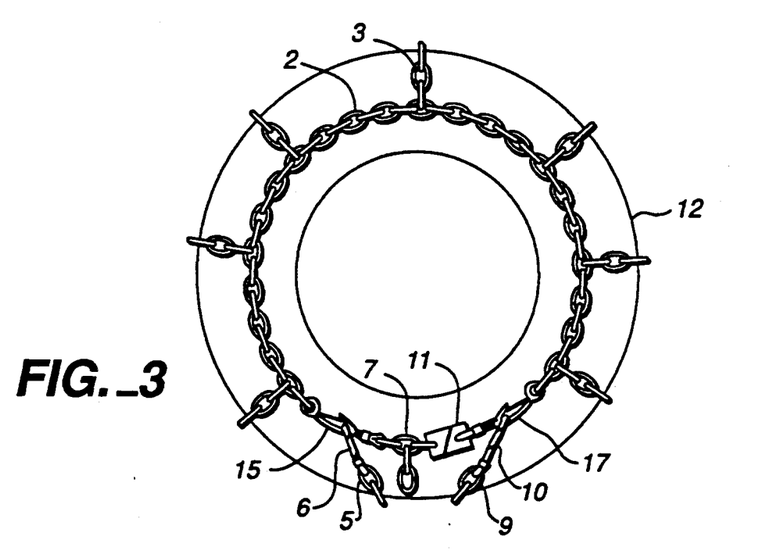
FIG. 3 is a view of the first embodiment as it would appear installed onto a tire.

The cable 6 is then inserted into the latch 15 by pushing on the spring steel retainer 16. The latch 15 is located at the end of the outside length of chain 2, at the opposite end of the tire chain from where the line 4 extends from. The cable 10 on the other line 8 is inserted into the latch 17 which is located at the opposite end of the outside length of chain 2 from the first latch 15. The two lines 4 and 8 are then pulled tightly together so that the cables 6 and 10 slip through the latches 15 and 17 which act somewhat like pulleys. The binder type chain latch 11 is then secured to a link in the chain 7 as best seen in FIG. 3.

After this initial securement is made the vehicle is driven a very short distance, preferably allowing the tire 12 to rotate approximately one quarter revolution. The binder type chain latch 11 is then released from, and re-secured to the chain 7 after additional slack has been taken out of the lines 4 and 8. Preferably, the chains 5 and 9 on the lines 4 and 8 should cross each other at about the center of the treads on the tire 12.

Figure 5:
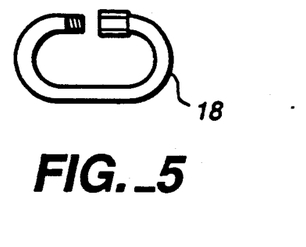
FIG. 5 is of a master chain link used to connect two lines of various embodiments of the invention.
Figure 6:
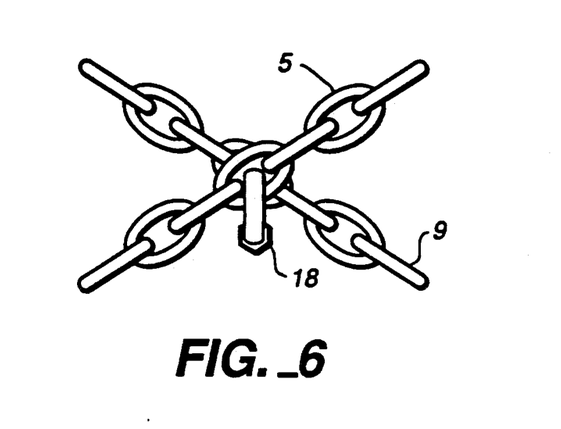
FIG. 6 is a view showing two chains connected by the master chain link shown in FIG. 5.

In order to more effectively secure the tire chain onto the tire 12, the two chains 5 and 9 on the lines 4 and 8 would be secured to each other at the point where they cross. A latch, such as the master chain link depicted in FIG. 5 as element 18 is inserted through a link in each of the chains 5 and 9. This secures the two lines 4 and 8 together without allowing them to slip, as depicted in FIG. 6. Of course, even a short piece of wire could be used for this purpose.

Figures 7, 8, 9, 10:
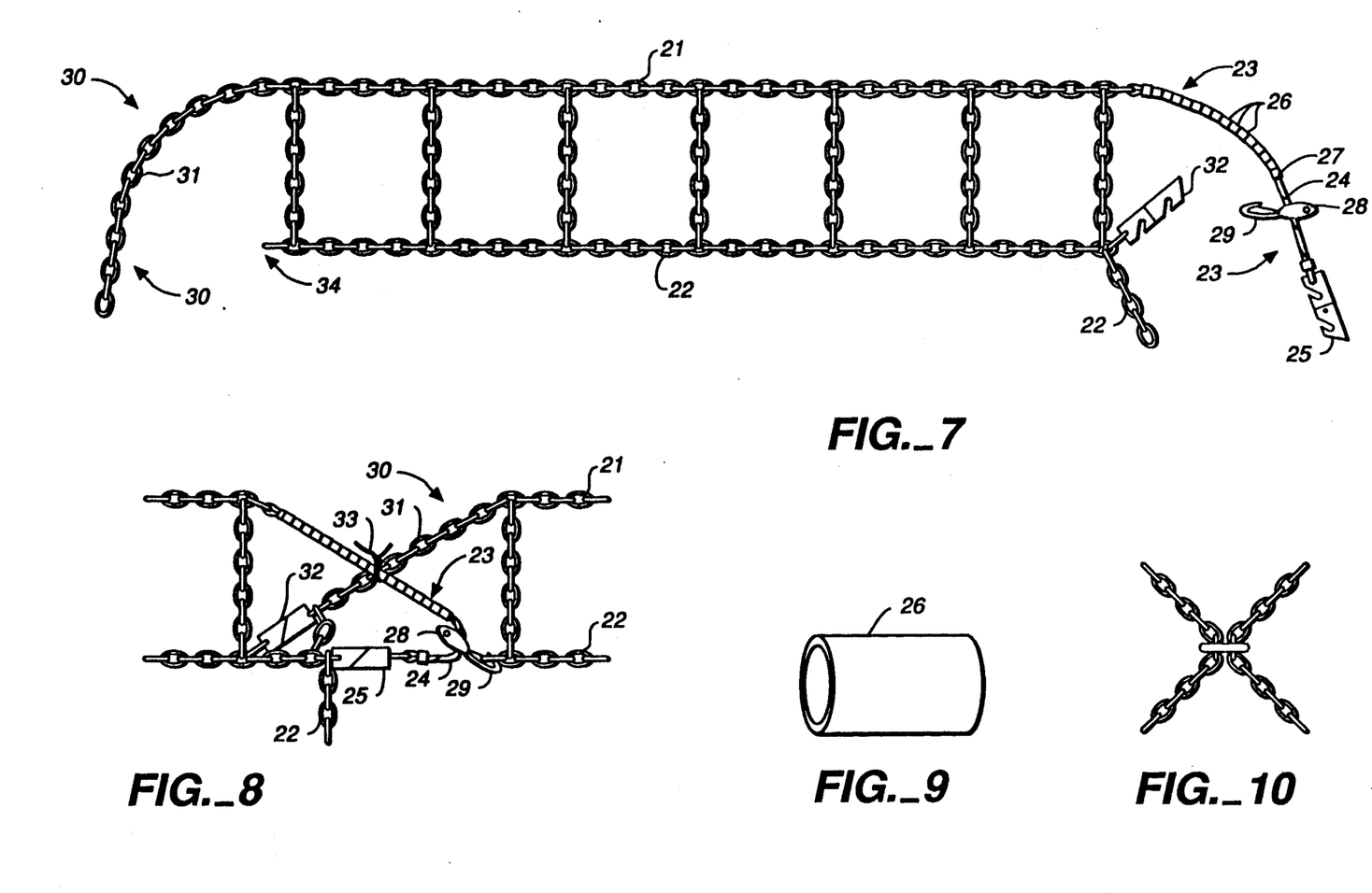
FIG. 7 is a view of the second embodiment of the invention.
FIG. 8 shows the manner of attachment of the second embodiment.
FIG. 9 is of a short tubular section used on various embodiments to cover a cable.
FIG. 10 shows one manner in which two chains may cross a tire.
Figure 11:
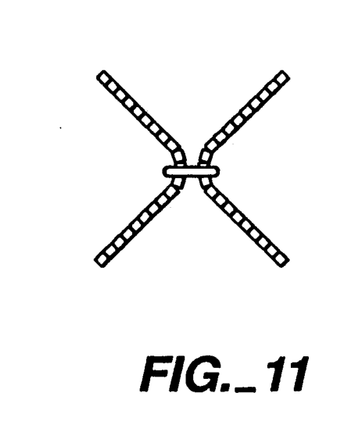
FIG. 11 shows one manner in which two cables may cross a tire.

When installed as described, the present embodiment of the invention has one of the two chains 5 or 9 crossing the other on the surface of the tire that contacts the road. While this configuration probably would not present any serious problems, it may, nonetheless, be desired to avoid it in order to have a more even wheel surface on the road. If, after the tire chain has been installed on the tire 12 as described thus far, the two cables 6 and 10 are removed from the latches 15 and 17 and reversed in their position, the configuration may be changed so that neither of the chains 5 or 9 crosses the other. If it is desired to make this last procedure standard, the chains 5 and 9 may be effectively replaced by cables, if so desired, since the latch 18 would not slip very far in this configuration, even though not inserted through a chain link. FIGS. 10 and 11 shows this configuration with chains and cables respectively.

A second embodiment of the present invention is depicted in FIG. 7, with the manner of attachment shown in FIG. 8. This embodiment is similar to the first, with the substantive difference being that only one of the lines extending from opposite ends of the inside length of chain 21 is passed through a latch or pulley. Referring now to FIGS. 7 and 8 of the drawings, a line 23 extends from one end of the inside length of chain 21. The entire line 23 is cable 24 with an attachment means 25 secured to its free end. The portion of the cable 24 that will be in contact with the road surface is covered with short tubular sections 26 formed of steel or another suitable material One such tubular section is shown in FIG. 9. The last tubular section 27 is crimped onto the cable 24 to prevent the other tubular sections 26 from sliding along the bare portion of the cable 24. A pulley 28 which is attached to an attachment means 29 remains with the bare portion of the cable 24.

Extending from the opposite end of the inside length of chain 21 is another line 30. In this example the line is composed entirely of chain 31. The initial procedure of installing the second embodiment of the invention proceeds in the same manner as that of the first embodiment. After the two lines 23 and 30 have been passed around behind the tire and brought to the front of the tire, the chain 31 is attached to the attachment means 32 located at the end of the outside length of chain 22 at the opposite end of the tire chain from where the line 30 extends from. The pulley 28 is attached with its attachment means 29 to the opposite end portion of the outside length of chain 22, as at 34. The attachment means 25 at the end of the cable 24 is then attached to the end portion of the outside length of chain 22 as best shown in FIG. 8.

As with the first embodiment, it would most probably be desired to connect the lines 23 and 30 at the point where they cross to make for a positive securement to the tire. The securement means shown in FIG. 8 is a simple piece of wire 33 inserted through a link in the chain 31, around the line 23, and twisted together. Also, as with the first embodiment, it may conceivably be desired to switch positions of the pulley 28 and the two ends of the two lines 23 and 30 after the two lines 23 and 30 have been secured together near their middle in order to prevent the two lines 23 and 30 from crossing each other. Although the specific example I have shown of this embodiment would not allow for this switching of the lines, a simple variation in the positioning of the attachment means would make it possible. A more durable securement means than the wire 33 would also be desirable if the lines are to be switched.

Figure 19:
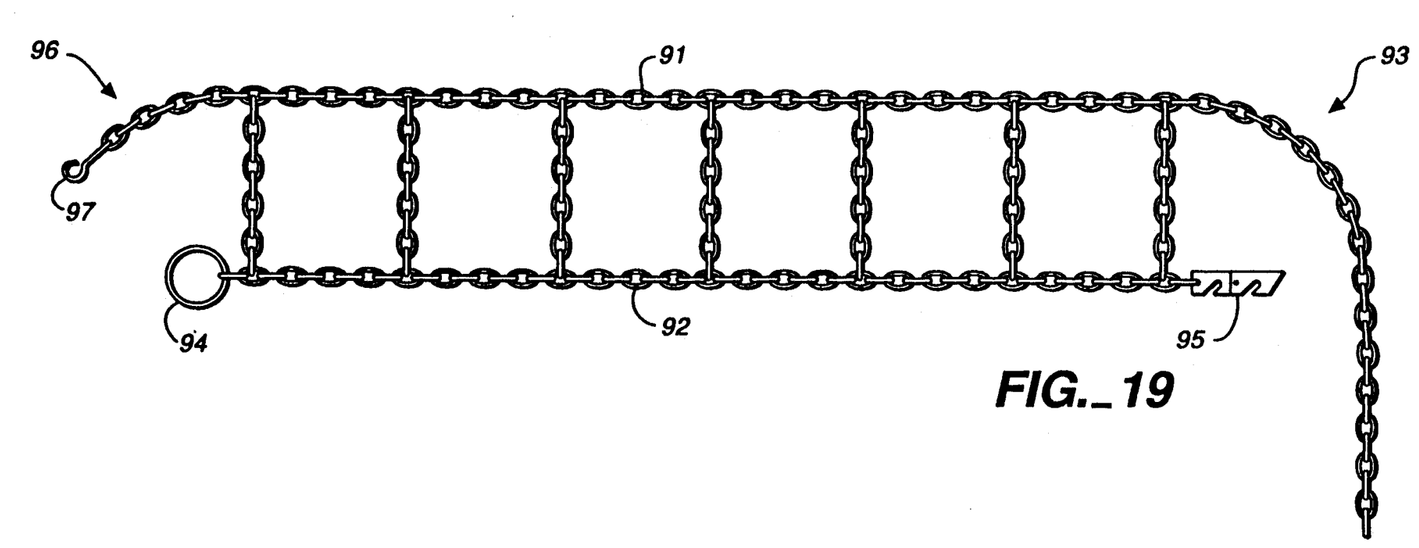
FIG. 19 is a view of the sixth embodiment of the invention.
Figure 20:
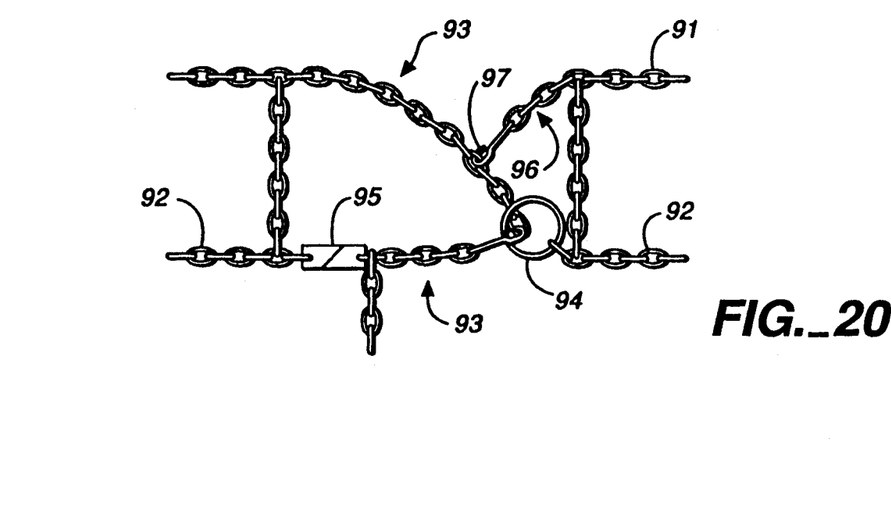
FIG. 20 shows the manner of attachment of the sixth embodiment.

In either of the first two embodiments, a variety of devices may substitute for the pulley 28 of the second embodiment or the latches 15 and 17 of the first embodiment, including a ring, such as the ring shown as element 94 in FIGS. 19 and 20, or even a link of the outside length of chain, if the particular attachment means used is small enough to pass through the link.

Figure 12:
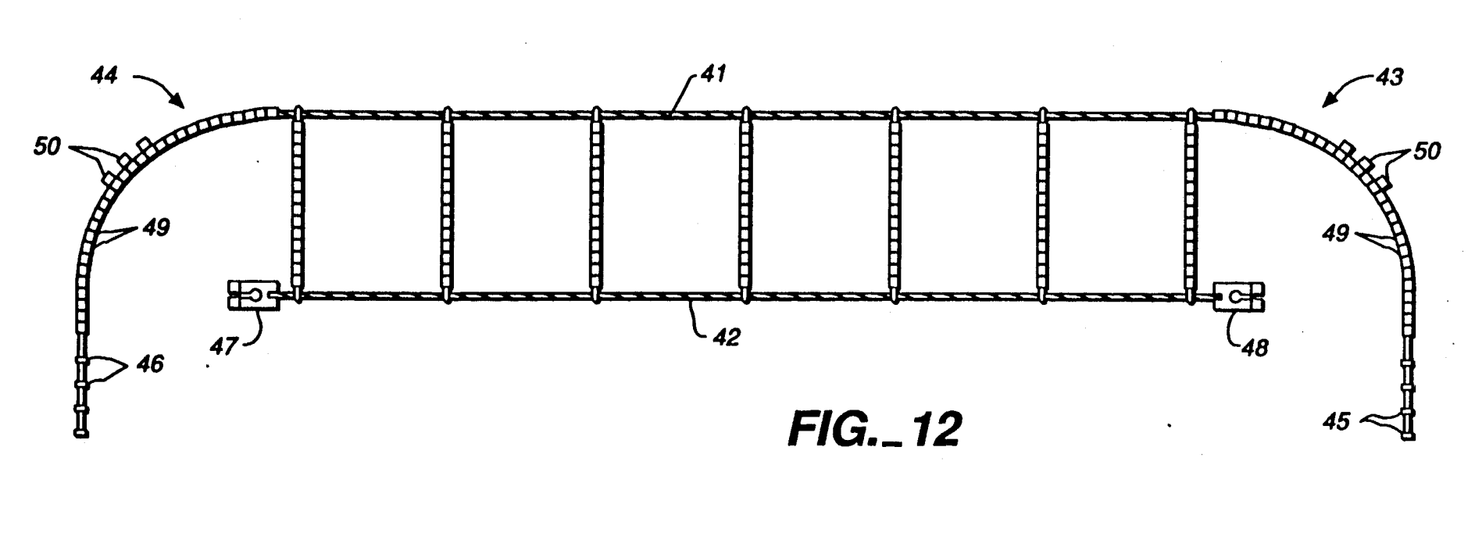
FIG. 12 is a view of the third embodiment of the invention.
Figure 13:
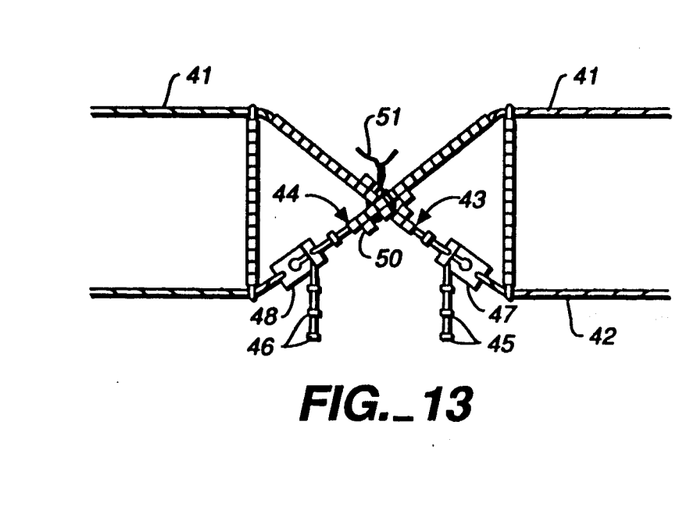
FIG. 13 shows the manner of attachment of the third embodiment.

The third embodiment of the present invention is shown in FIG. 12, with the manner of attachment shown in FIG. 13. In addition to the specific characteristics of this embodiment, the tire chain shown is of the cable type rather than the chain type depicted thus far.

Tire chains constructed of cable are often referred to as "cable chains". The tire chain depicted in FIGS. 12 and 13 may then be alternately referred to as a cable chain, as may any of the embodiments when constructed largely of cable. The term "tire chain", however, will be used exclusively in the remainder of the Detailed Description for the sake of continuity.

In third embodiment, the two lines 43 and 44 extending from the ends of the inside length of cable 41 are passed around behind the tire to the front of the tire in the same manner as in the first two embodiments. However, each line 43 and 44 is attached directly to the ends of the outside length of cable 42 with attachment means 45, 46, 47 and 48 without first passing through any direction changing device such as the latches 15 and 17 or pulley 28 of the first two embodiments. Each line 43 and 44 is attached to the end of the outside length of cable 42 at the opposite end of the tire chain from where it extends from. Hence, connection means 45 attaches to 47, and 46 attaches to 48.

Figure 14:
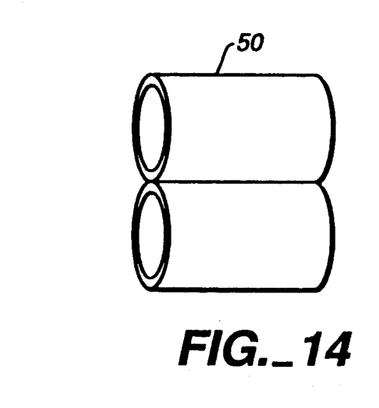
FIG. 14 is of two short tubular sections welded or formed together, and used in various embodiments of the invention.

As with the previous embodiments, it is probably desirable to connect the two lines 43 and 44 at the point where they cross. In order to allow for a positive connection without slippage, several of the short tubular sections 49 have been welded, side by side, to another section as depicted by element 50 and FIG. 14. In this example, a wire 51 connects the two lines 43 and 44. Also, as with the first two embodiments, it may be desired to switch positions between the ends of the lines 43 and 44 and the connection means 47 and 48 in order to avoid having one of the two lines 43 or 44 crossing the other on the surface of the tire that contacts the road. If done at all, the procedure of switching the lines 43 and 44 would of course be done after the two lines 43 and 44 are connected, and if the procedure is to become standard, the double welded tubular sections 50 would not be necessary.

Figure 15:
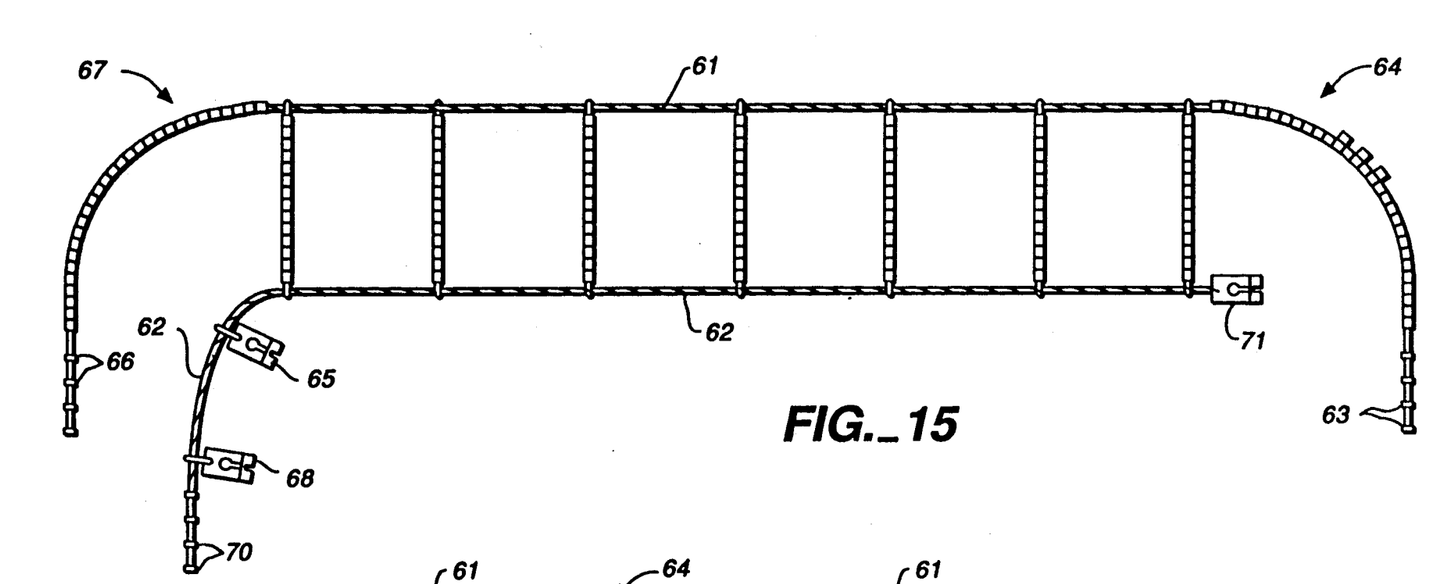
FIG. 15 is a view of the fourth embodiment of the invention.
Figure 16:
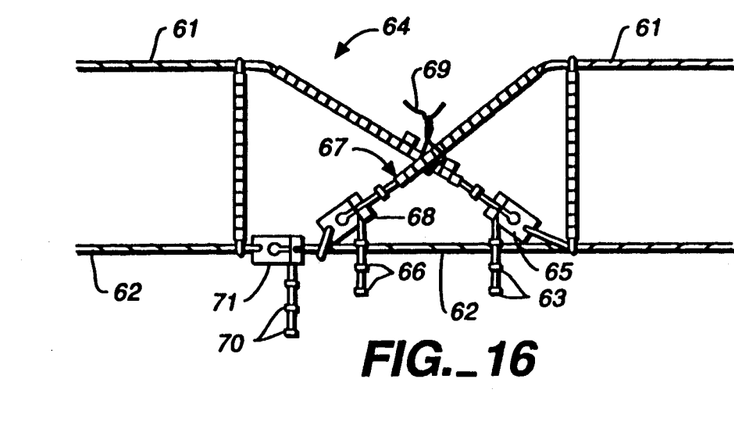
FIG. 16 shows the manner of attachment of the fourth embodiment.

The fourth embodiment is shown in FIG. 15, with the manner of attachment shown in FIG. 16. The fourth embodiment is basically the same as the third embodiment except that, the outside length of cable 62 extends further at one end to connect with the opposite end of the outside length of cable 62 with connection means 70 and 71 in the same manner as conventional tire chains connect on the outside of a tire. This construction allows for a simple initial connection to be made at the outside of the tire allowing the vehicle to be moved and the final adjustment to be made.

The attachment means 63 at the end of the line 64 is attached to the attachment means 65 on the outside length of cable 62; and the attachment means 66 at the end of the other line 67 is similarly attached to its corresponding attachment means 68 located on the same end of the outside length of cable 62. As with all previous embodiments, it would probably be desired that the two lines 64 and 67 be connected to each other where they cross. A wire 69 is shown connecting the two lines 64 and 67. Also, as with all previous embodiments, the connection means 63 and 66 may be switched in position with their corresponding connection means 65 and 68, to avoid having one line cross the other.

Figures 17, 18:
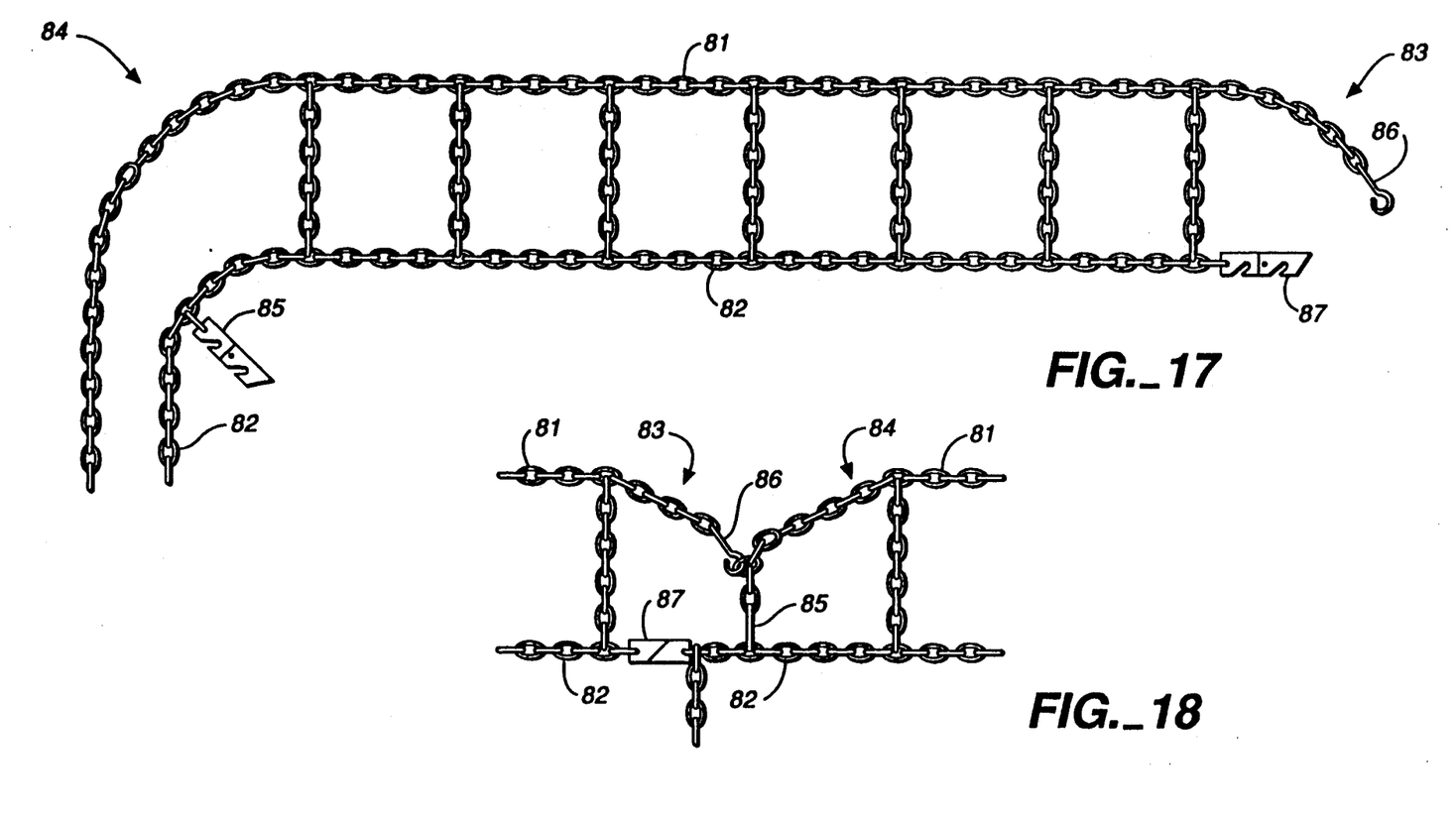
FIG. 17 is a view of the fifth embodiment of the invention.
FIG. 18 shows the manner of attachment of the fifth embodiment.

The fifth embodiment of the invention is shown in FIG. 17, with the manner of attachment shown in FIG. 18. The fifth embodiment is similar to the fourth, however only one line 84 of the two lines 83 and 84 extending from the opposite ends of the inside length of chain 81 crosses the tire and is connected with the outside length of chain 82 with the connection means 85. The other line 83 is connected with the hook 86 to the longer line 84 on or near the surface of the tire that contacts the road. The end of the outside length of chain 82 connects with the opposite end of the outside length of chain 82 with connection means 87. The advantage of the fifth embodiment over the fourth is the elimination of slack in the outside length of chain—or cable, as the case may be—between the points that the two lines connect.

The sixth embodiment is shown in FIG. 19, with the manner of attachment shown in FIG. 20. The sixth embodiment combines some features of the fifth and second embodiments. In this embodiment, the longer line 93 crosses the tire and passes through the ring 94 at the opposite side and opposite end of the tire chain. The end of the line 93 is attached to the connection means 95 at the opposite side, at the same end of the tire chains from where the line 93 extends from, while the shorter line 96 is attached with the hook 97 to the longer line 93 on or near the surface of the tire that contacts the road. The ring 94 may of course be replaced with other devices such as the latches 15 and 17 of the first embodiment, or even a pulley if the particular line 93 used is of a type suitable to be used with a pulley.

Figure 21:
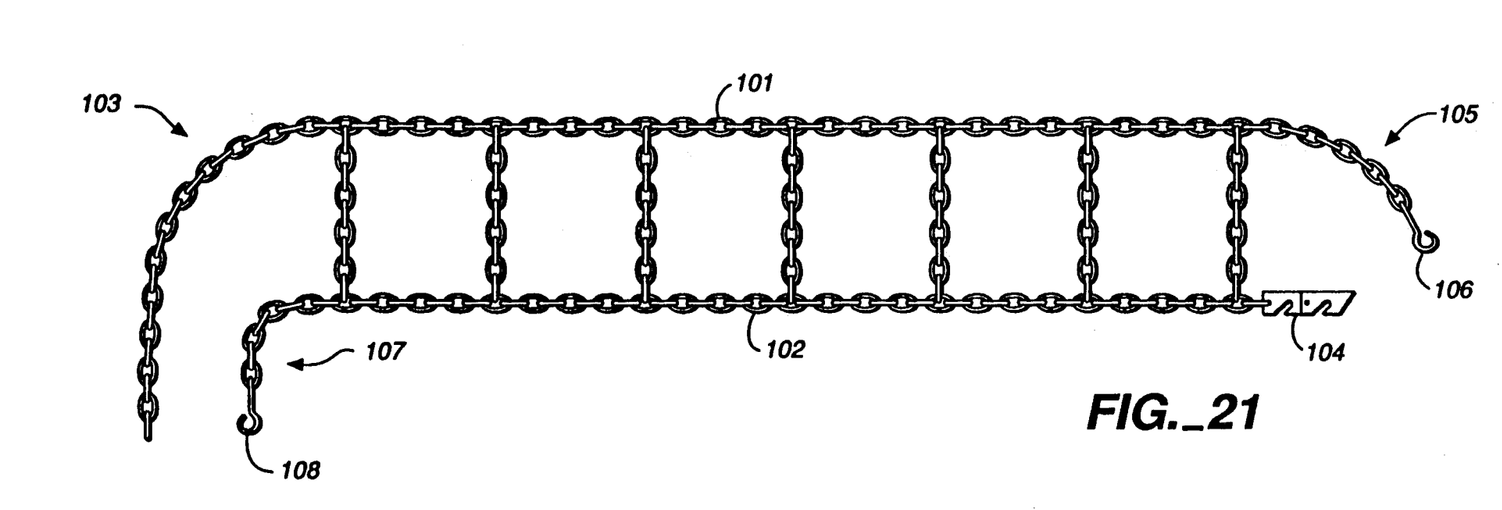
FIG. 21 is a view of the seventh embodiment of the invention.
Figure 22:
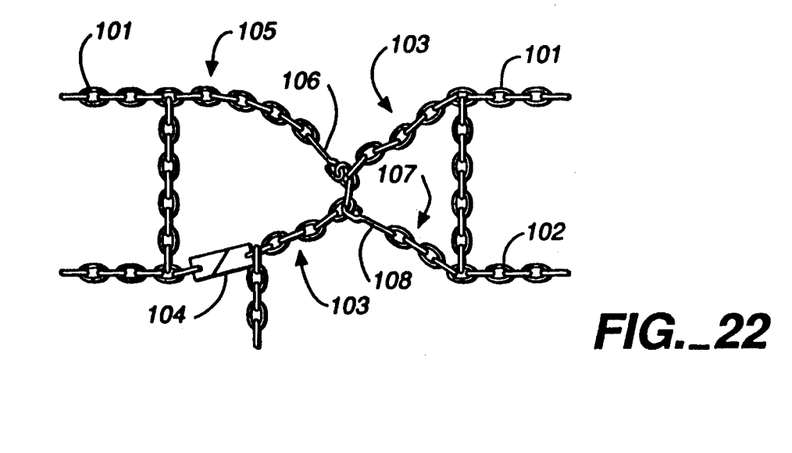
FIG. 22 shows the manner of attachment of the seventh embodiment.

The seventh embodiment is shown in FIG. 21, with the manner of attachment shown in FIG. 22. In the seventh embodiment, the long line 103 extending from the end of the inside length of chain 101 crosses the tire and connects with the attachment means 104 located at the end of the outside length of chain 102, at the opposite end of the tire chain from where the long line 103 extends from. A short line 105 extends from the opposite end of the inside length of chain 101 from where the long line 103 extends from. The short line 105 connects to the long line 103 with the hook 106 on or near the surface of the tire that contacts the road. Another short line 107 extends from the end of the outside length of chain 102, at the opposite end from the attachment means 104. The short line 107 connects with the hook 108 to the long line 103 on or near the surface of the tire that contacts the road.

Figures 23, 24:
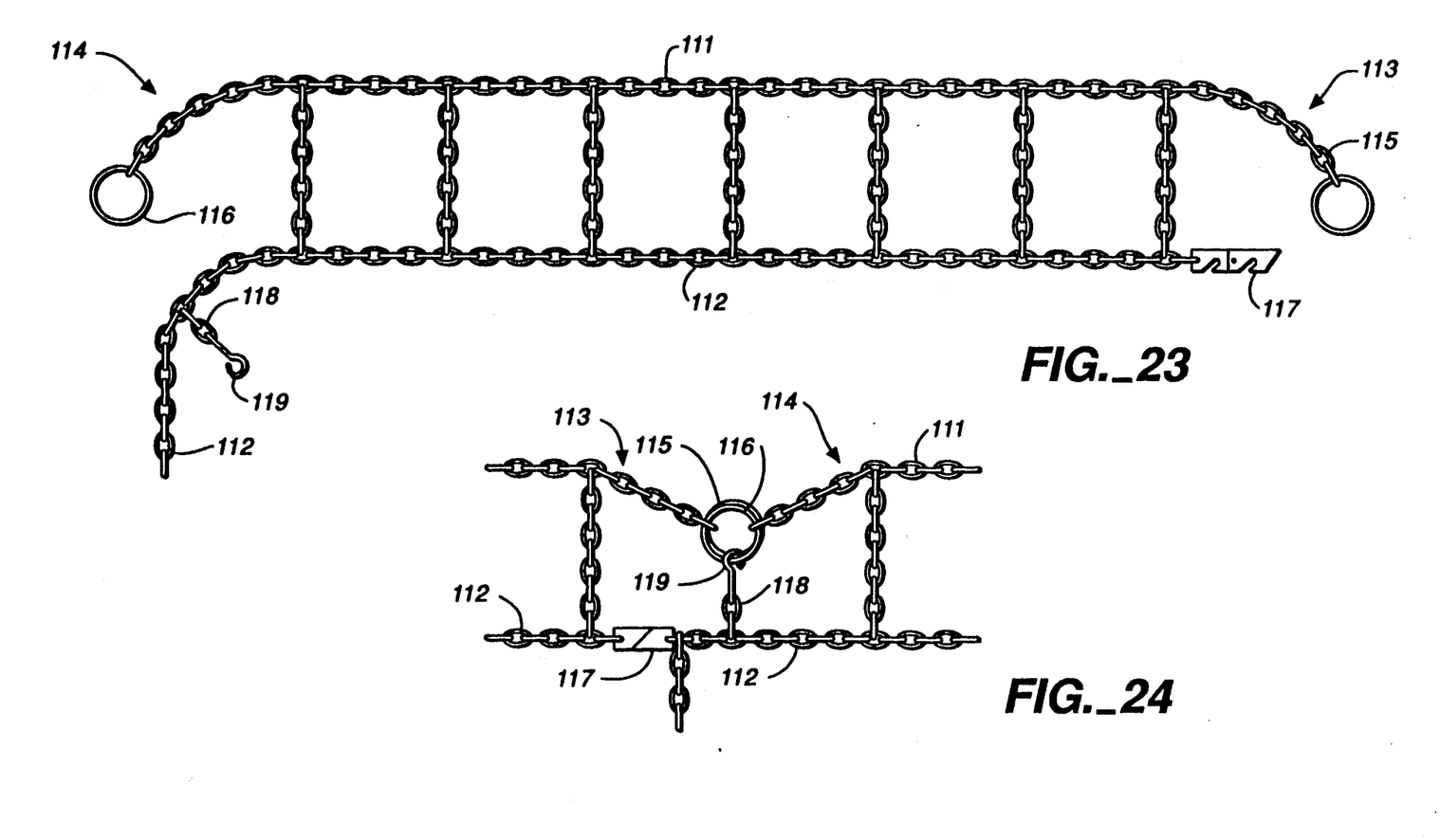
FIG. 23 is a view of the eighth embodiment of the invention.
FIG. 24 shows the manner of attachment of the eighth embodiment.

The eighth embodiment is shown in FIG. 23, with the manner of attachment shown in FIG. 24. In the eighth embodiment, a line 113 extends from one end of the inside length of chain 111, while another line 114 extends from the opposite end of the inside length of chain 111. The two lines 113 and 114 have rings 115 and 116 on their ends. The two opposite ends of the outside length of chain 112 connect with connection means 117. A short line 118 extends from the outside length of chain 112. The short line 118 connects with the lines 113 and 114 by passing the hook 119 through the rings 115 and 116 on or near the surface of the tire that contacts the road, or on the outside of the tire. The entire adjustment of the tire chains may be made between the connection means 117 and the outside length of chain 112, or a separate adjustment means may be added at the junction of the short line 118 and the outside length of chain 112, though none is shown in the drawings.

Figures 25, 26:
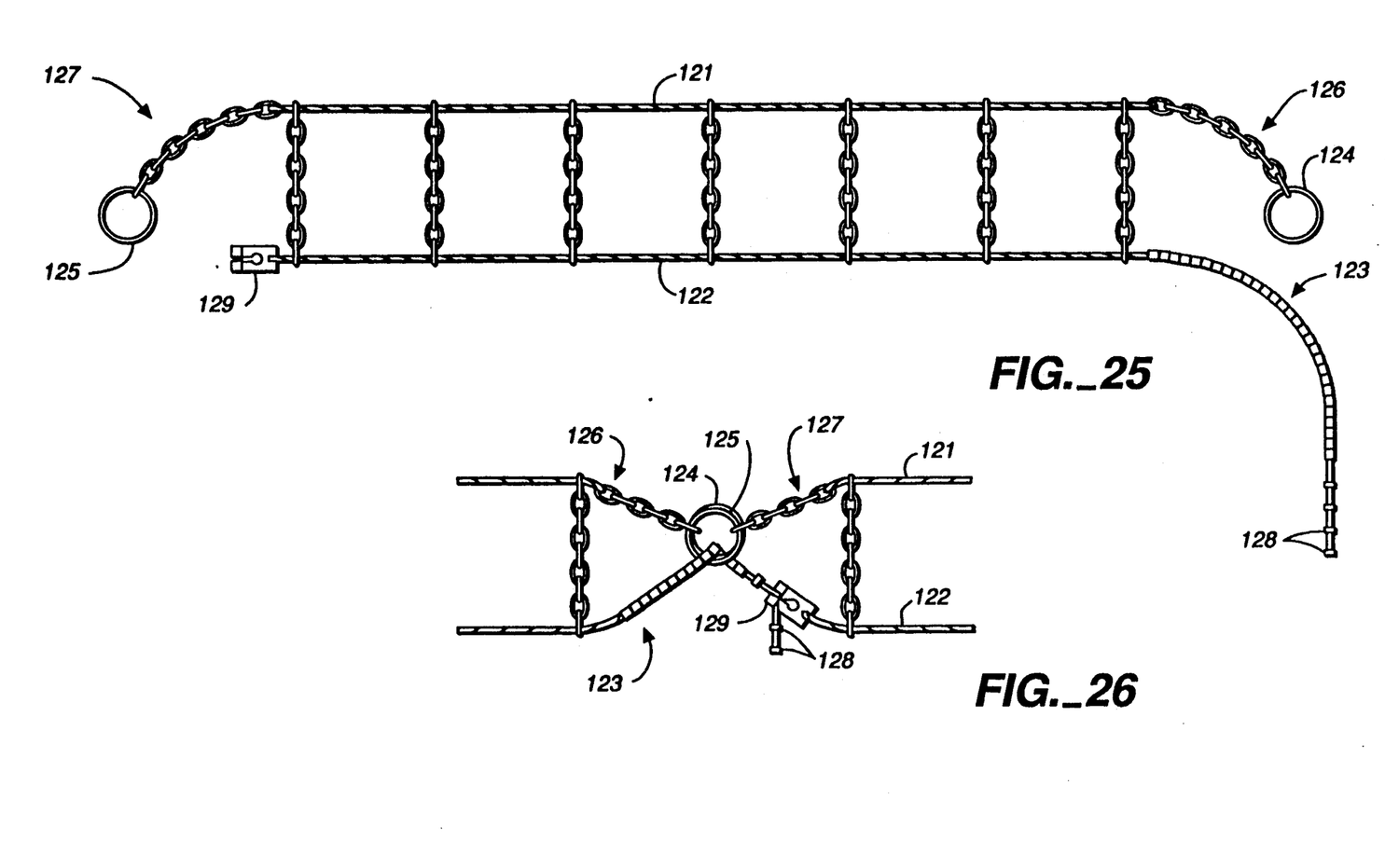
FIG. 25 is a view of the ninth embodiment of the invention.
FIG. 26 shows the manner of attachment of the ninth embodiment.

The ninth embodiment is shown in FIG. 25, with the manner of attachment shown in FIG. 26. In the ninth embodiment, the long line 123 extending from the end of the outside length of cable 122 passes through the rings 124 and 125 located at the ends of the lines 126 and 127 respectively. The lines 126 and 127 extend from the opposite ends of the inside length of cable 121. The attachment means 128 at the end of the long line 123 attaches to the complimentary attachment means 129 at the opposite end of the outside length of cable 122.

Figure 27:
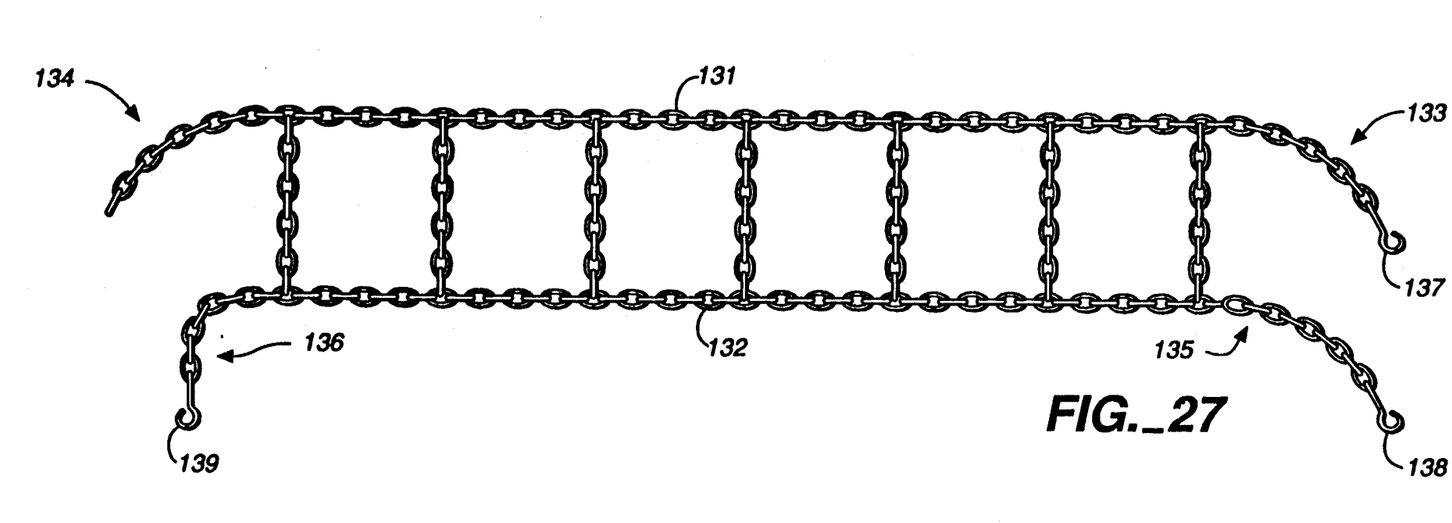
FIG. 27 is a view of the tenth embodiment of the invention.
Figure 28:
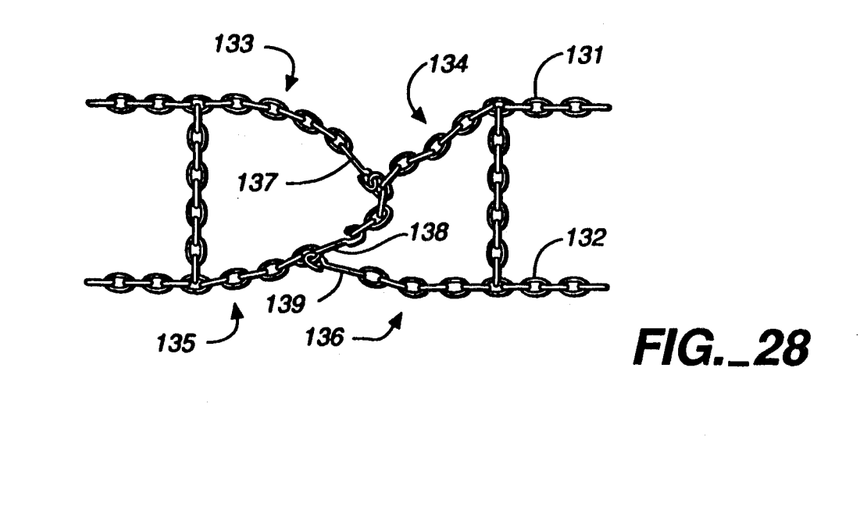
FIG. 28 shows the manner of attachment of the tenth embodiment.

The tenth embodiment is shown in FIG. 27, with the manner of attachment shown in FIG. 28. In the tenth embodiment, a separate line 133, 134, 135 and 136 extends from each of the four corners of the tire chain. The four lines 133, 134, 135 and 136 are secured to each other, directly or indirectly, by hooks 137, 138 and 139 in any of a number of possible ways. Generally, securement is made on or near the surface of the tire that contacts the road. One method of securement is depicted in FIG. 28. Adjustment is achieved by the manner in which the lines 133, 134, 135 and 136 are secured to each other. Although not shown in the drawings, each of the four lines 133, 134, 135 and 136 may have a hook on its end.

Figure 29:
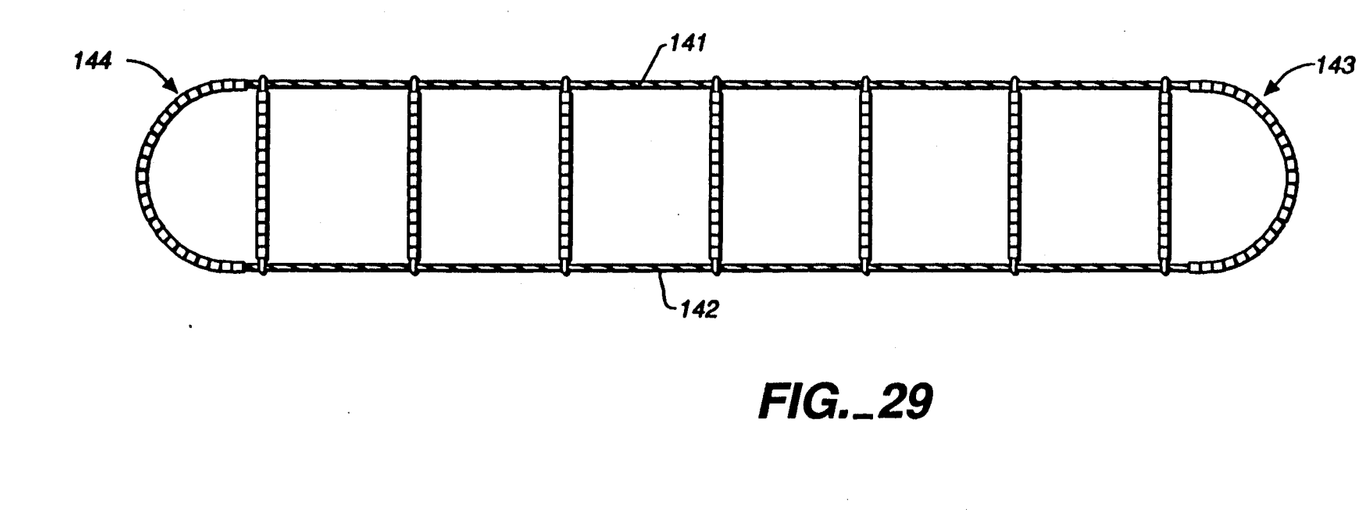
FIG. 29 is a view of the eleventh embodiment of the invention.
Figure 30:
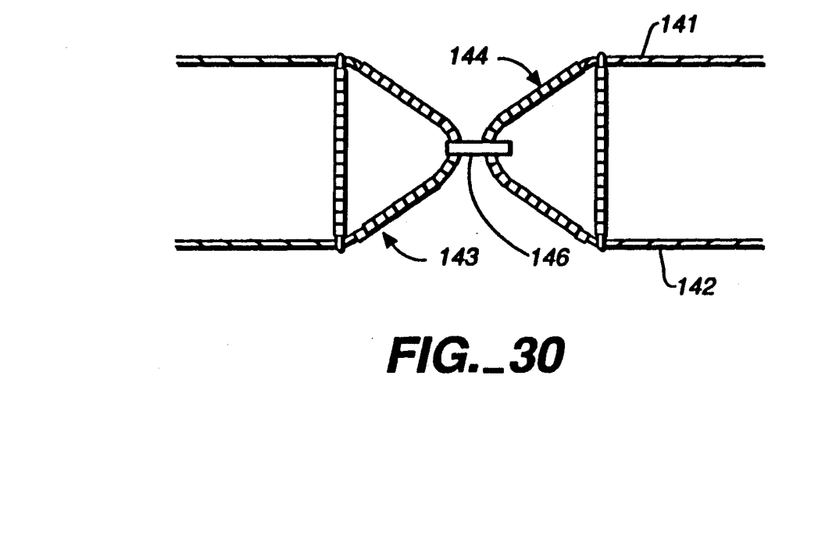
FIG. 30 shows the manner of attachment of the eleventh embodiment.

The eleventh embodiment is shown in FIG. 29 with the manner of attachment shown in FIG. 30. In the eleventh embodiment, a line 143 extends from the end of the inside length of cable 141 and connects with the end of the outside length of cable 142 on the same end of the tire chain. On the other end of the tire chain, another line 144 extends from that end of the inside length of cable 141, and connects with the end of the outside length of cable 142. The two lines 143 and 144 are connected at or near their centers with an attachment means, such as the device depicted in FIG. 31 as element 146, on which adjustment capability is provided by the hooks 145.

Figure 32:
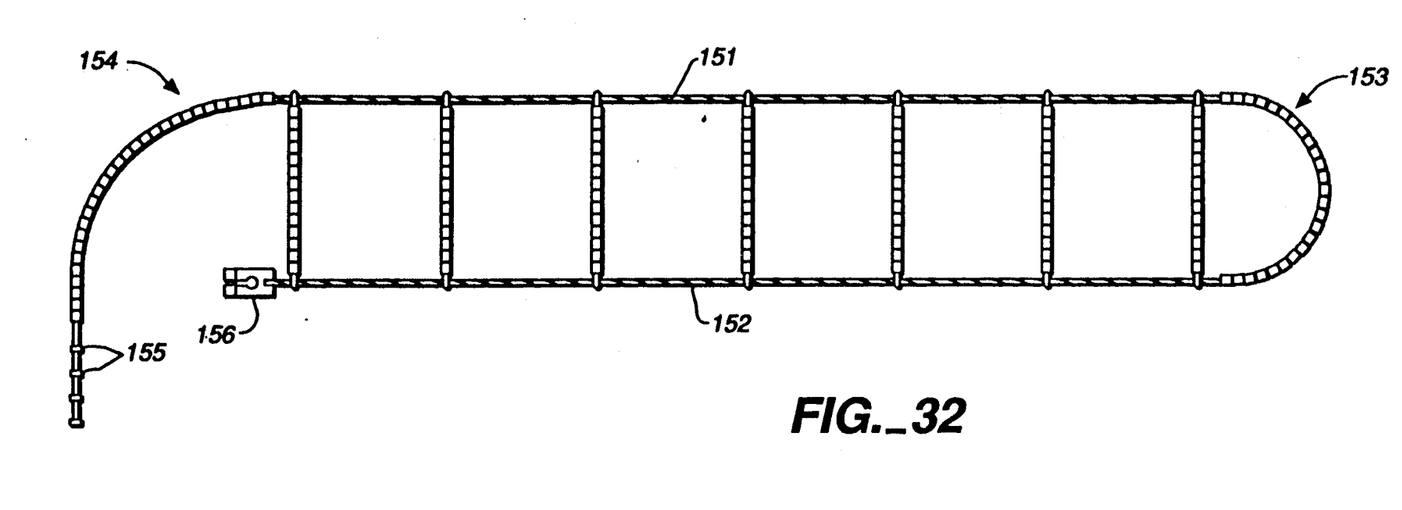
FIG. 32 is a view of the twelfth embodiment of the invention.
Figure 33:
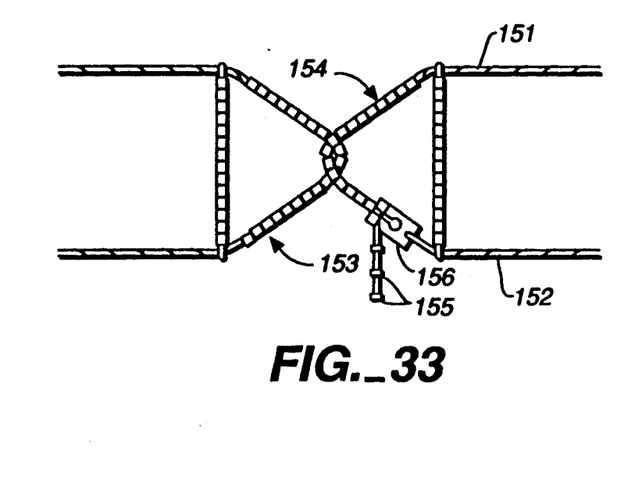
FIG. 33 shows the manner of attachment of the twelfth embodiment.

The twelfth embodiment is shown in FIG. 32, with the manner of attachment shown in FIG. 33. In the twelfth embodiment, a line 153 extends from the end of the inside length of cable 151 and connects with the end of the outside length of cable 152 on the same end of the tire chain. At the other end of the tire chain, a line 154 extends from the end of the inside length of cable 151. When securing to a tire, the line 154 is passed around the other line 153 and is attached with attachment means 155 to the complimentary attachment means 156 located at the end of the outside length of cable 152, on the same end of the tire chain as the line 154 extends from. In an alteration of this embodiment, the line 153 could be disconnected and connected to the outside length of cable 152, in the same manner as line 154. This, however, would be essentially the same as one of the methods used in the third embodiment of this invention.

Figure 31:
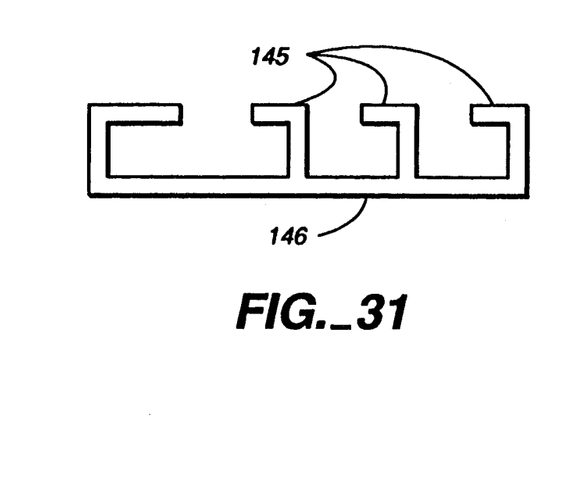
FIG. 31 shows a device used in securing the eleventh embodiment of the invention onto a tire.

Also, in the eleventh embodiment of the invention, the device depicted in FIG. 31 as element 146, or a similar device, may be permanently attached to one of the two lines 143 or 144 at or near the center of the line 143 or 144 allowing the device to be releasably secured to the other line 143 or 144. Preferably, an adjustment capability would be provided with the line 143 or 144 to which the device is not permanently attached, such as may be provided by the hooks 145.

While several embodiments of this invention have been shown and described herein, it should be understood that changes and modifications may be made without departing from the scope of this invention. It is especially important that the cables and chains comprising the "lines" of the various embodiments may readily be replaced with the other, or combinations thereof, and the combinations of the cables and chains may readily be replaced with one or the other, or combinations constructed in a different manner. The lines may also be constructed, entirely or partially, of other materials such as nylon cord. In fact, in practice, lines probably would be used that were composed or constructed differently than those I have shown and described in these embodiments. Also, other connection means than those shown in the various embodiments may easily be used in place of those types shown. This also applies to the parts used in several of the embodiments through which lines were designed to slip—the rings, latches, and pulley.

Additionally, I have shown those types of tire chains that were constructed entirely of chain, those types constructed of cable, and one in which the conventional portion was constructed of both chain and cable. It is important that any of the various types of tire chains, or anti-skid devices of other names that provide the same function, may be used with any of the embodiments. There are types that I have not shown that may be referred to by various names. For example, some are constructed of plastic. Those constructed of cable are usually referred to as "cable chains".

The "lines" of the various embodiments should be viewed as extending from an end or end portion of the tire chain or cable chain. However, it is anticipated that they might alternately be viewed as comprising that end portion.

In the matter of terminology, the inside and outside length of chain or cable has been referred to in the various embodiments in this descriptive manner; that is, as either the inside or outside length of chain or cable. (e.g. element 1 of FIG. 1 is referred to as the "inside length of chain"). However, since materials other than chain or cable may be used for these members, and in the interest of presenting a single designating term, they may also be referred to as "inside member" and "outside member", or collectively as "side members" or "flexible side members" (since they can be bent or flexed). Similarly, the shorter length of chain, cable or other utilized material that cross the tread of the tire between the two side members, as element 3 in FIG. 1, may be referred to as "cross members".

Also: in the second embodiment, the end of the line 23 may connect with the line 30 rather than with the end portion of the outside length of chain 22; and, similarly, the end of line 30 may connect with the line 23 rather than with the outside length of chain 22.

I claim:

1. A method of securing a tire chain or a cable chain, to a tire, wherein a separate line comprised of a cable, cord, or chain, or any combination thereof, comprises or extends from each of the two opposite end portions of said tire chain or cable chain, on the same side (1,21,41 & 61) of said tire chain or cable chain; and wherein said method comprises the steps of moving said lines across the outer surface of said tire, to the other side of said tire, and releasably connecting said lines with the portion (2,22,42 & 62) of said tire chain or cable chain located at the other side of said tire from where said lines extend from; and releasably connecting said lines with each other.

2. A method according to claim 1 wherein said lines are releasably connected with each other at two different positions along said lines.

3. A method according to claim 1 wherein the end portions of said lines are releasably connected with each other.

4. A method according to claim 1 wherein said lines are releasably connected with each other at a position along said lines other than at the ends of the lines.

5. A method according to claim 1 wherein the end portions of said lines are releasably connected with each other; and wherein said lines are also releasably connected with each other at a position along said lines other than at the end portions of said lines.

6. A method of securing a tire chain or a cable chain, to a tire, wherein a separate line comprised of a cable, cord, or chain, or any combination thereof, extends from each of the two opposite end portions of said tire chain or cable chain, on the same side (1,21,41 & 61) of said tire chain or cable chain; and wherein said method comprises the steps of moving said lines across the outer surface of said tire between said end portions of said tire chain or cable chain, to the other side of said tire, and releasably connecting said lines with the other side (2,22,42 & 62) of said tire chain or cable chain.

7. A method according to claim 6 wherein said lines are releasably connected with each other.

8. A method according to claim 6 wherein said lines are releasably connected with each other at two different positions along said lines.

9. A method according to claim 6 wherein the end portions of said lines are releasably connected with each other.

10. A method according to claim 6 wherein said lines are releasably connected with each other at a position along said lines other than at the ends of said lines.

11. A method according to claim 6 wherein the end portions of said lines are releasably connected with each other; and wherein said lines are also releasably connected with each other at a position along said lines other than at the end portions of said lines.

12. A method of securing an anti-skid device to a tire, said anti-skid device being of the type comprising two flexible side members with a plurality of cross members extending therebetween, said cross members being designed to cross the tread surface of a tire, wherein a separate line comprised of a cable, cord, or chain, or any combination thereof, comprises or extends from each of the two opposite end portions of said anti-skid device, on the same side (1,21,41 & 61) of said anti-skid device; and wherein said method comprises the steps of moving said lines across the outer surface of said tire, to the other side of said tire, and releasably connecting said lines with the portion (2,22,42 & 62) of said anti-skid device located at the other side of said tire from where said lines extend from; and releasably connecting said lines with each other.

13. A method according to claim 12 wherein said lines are releasably connected with each other at two different positions along said lines.

14. A method according to claim 12 wherein the end portions of said lines are releasably connected with each other.

15. A method according to claim 12 wherein said lines are releasably connected with each other at a position along said lines other than at the ends of said lines.

16. A method according to claim 12 wherein the end portions of said lines are releasably connected with each other; and wherein said lines are also releasably connected with each other at a position along said lines other than at the end portions of said lines.

17. A method of securing an anti-skid device to a tire, said anti-skid device being of the type comprising two flexible side members with a plurality of cross members extending therebetween, said cross members being designed to cross the tread surface of a tire, wherein a separate line comprised of a cable, cord, or chain, or any combination thereof, extends from each of the two opposite end portions of said anti-skid device, on the same side (1,21,41 & 61) of said anti-skid device; and wherein said method comprises the steps of moving said lines across the outer surface of said tire between said end portions of said anti-skid device, to the other side of said tire, and releasably connecting said lines with the other side (2,22,42 & 62) of said anti-skid device.

18. A method according to claim 17 wherein said lines are releasably connected with each other.

19. A method according to claim 17 wherein said lines are releasably connected with each other at two different positions along said lines.

20. A method according to claim 17 wherein the end portions of said lines are releasably connected with each other.

21. A method according to claim 17 wherein said lines are releasably connected with each other at a position along said lines other than at the ends of said lines.

22. A method according to claim 17 wherein the end portions of said lines are releasably connected with each other; and wherein said lines are also releasably connected with each other at a position along said lines other than at the end portions of said lines.

* * * * *